Figure 1:
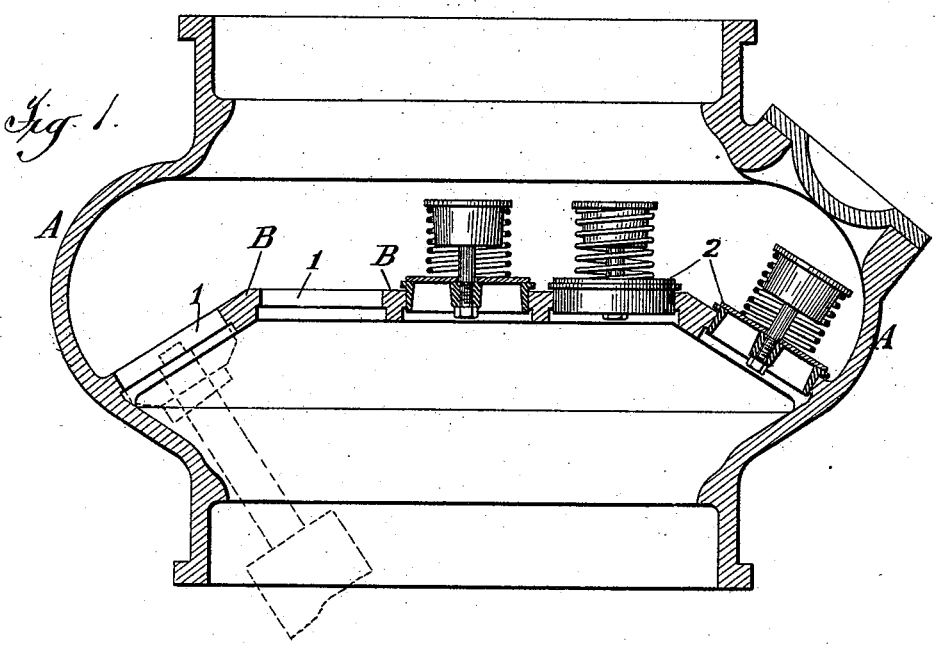

(No Model.)

A. J. CALDWELL.
CHECK VALVE.

No. 528,360. Patented Oct. 30, 1894.

Attest:
Geo. H. Botts.
C. J. Sawyer

Inventor:
Andrew J. Caldwell
by
Philipp Mauro & Phelps
Attys

UNITED STATES PATENT OFFICE.

ANDREW J. CALDWELL, OF BROOKLYN, NEW YORK, ASSIGNOR TO HENRY R. WORTHINGTON, OF ELIZABETH, NEW JERSEY.

CHECK-VALVE.

SPECIFICATION forming part of Letters Patent No. 528,360, dated October 30, 1894.

Application filed October 24, 1892. Renewed March 2, 1894. Serial No. 502,145. (No model.)

*To all whom it may concern:*

Be it known that I, ANDREW J. CALDWELL, a citizen of the United States, residing at Brooklyn, county of Kings, and State of New York, have invented certain new and useful Improvements in Multiple Check-Valves, fully described and represented in the following specification and the accompanying drawings, forming a part of the same.

In the construction of that form of multiple check valves consisting of a number of small valves placed in a diaphragm extending across the pipe to which the check valve is applied, it is necessary that the diaphragm should be enlarged beyond the area of the pipe, in order to enable a sufficient number of valves to be placed in the diaphragm to secure a valve area of the required percentage of the pipe area, and for this purpose the check valve is made larger in the center than at the ends or valve openings at which connection is made with the pipe or pipes to which the check valve is to be applied. In constructions heretofore in use the diaphragm extends in a single plane across the check valve within the space produced by the enlargement above referred to, and the valve seats being drilled and the valves opening at right angles to the diaphragm. It is obvious, therefore, that in such constructions one or more of the outer rows of valve seats must be drilled by hand with much difficulty, and at consequent expense, as the opening of the check valve, which is smaller than the diaphragm, prevents the introduction of a machine borer at the proper angle. The check valve may be made in two parts and flanged on the center, thus enabling the seats to be drilled in the diaphragm in one part and the other part of the check valve to be then secured in place to complete the check valve, but this construction is expensive and objectionable, and a check valve in one casting much preferable.

I provide an improved check valve by which the proper valve area may be secured and all the check valve seats drilled in the complete construction by machine, by throwing the center of the diaphragm up so as to place the outer row or rows of valves at such an angle that they can be reached with the boring tool through the opening of the check valve. By thus throwing the center of the diaphragm up and arranging the diaphragm so that the pressure comes on the crown of the arch, I am enabled to make a cheaper and lighter check valve while securing the requisite strength, by omitting the ribs beneath the diaphragm which heretofore have been used to strengthen and support it. It will be understood, however, that my invention is not to be limited to a construction in which the ribs are not used, but that the main feature of my invention, consisting of a diaphragm so arranged that the valve seats are placed at such an angle as to permit them to be bored by machine, may be used in check valves employing these supporting ribs or other similar devices.

In the accompanying drawings forming a part of this specification, I have shown for the purpose of illustration a multiple check valve of a common form embodying my invention, in which drawings—

Figure 2:
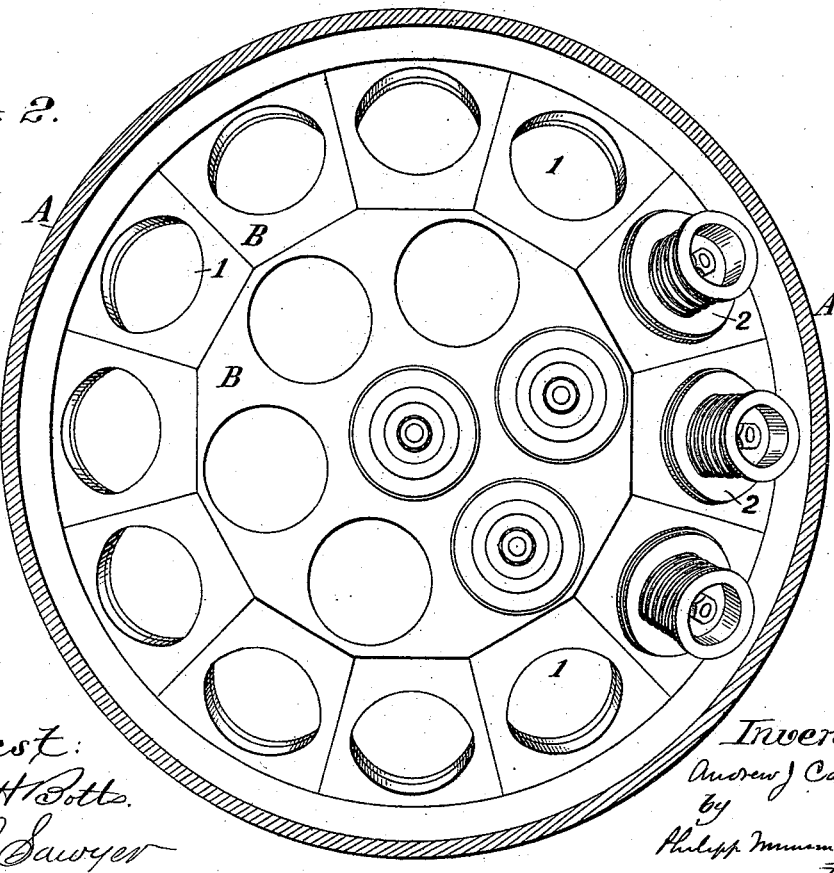

Figure 1 is a central, longitudinal section of the check valve, and Fig. 2, a horizontal section of the same.

A is the casting forming the valve casing and having the usual open ends for attachment to the pipe upon which the check valve is to be placed, the central enlargement for increasing the cross area, and the diaphragm B within the enlargement provided with the usual valve seats 1 for the valves 2, which may be of any suitable construction, but are shown as spring valves of a common form.

In the construction of check valves of this class, the diaphragm has heretofore been extended in a single plane across the check valve casing at the enlargement, the result being that the insertion of the boring tool at the proper angle to drill the outside row or rows of seats is prevented, so that these seats, forming a large part of those in the valve, had to be drilled by hand, which, it is obvious, is a difficult and expensive operation to perform within the small space between the valves and the wall of the check valve. In my improved construction, however, as shown in the drawings, the center of the diaphragm is thrown up so as to bring the outer row of valve seats at the proper angle to be reached and drilled by a machine borer, the position of the borer in drilling one of the outside seats being shown in dotted lines in Fig. 1.

By throwing the center of the diaphragm up and arranging the diaphragm so that the pressure comes on the crown of the arch, as shown in the drawings, I am enabled also to omit the supporting or strengthening ribs previously used beneath the diaphragm, thus simplifying and cheapening the construction of the check valve and making it much lighter with the requisite strength.

It is obvious that my invention is not to be limited to the exact form or construction of the valves or casting shown, but that the invention is applicable to all multiple check valves of the general class employing a number of valves and having an enlargement to accommodate a diaphragm of greater area than the pipe with which the check valve is to be used.

What I claim is—

1. A multiple check valve provided with a diaphragm transverse to and of greater area than the valve opening and having its center thrown up so as to place the outer valve seats at the proper angle to be drilled by a tool passing through the valve opening, substantially as described.

2. A multiple check valve provided with a diaphragm transverse to and of greater area than the valve opening said diaphragm being supported at the edges only and having its center thrown up to form an arch supporting the pressure and to place the outer valve seats at the proper angle to be drilled by a tool passing through the valve opening, substantially as described.

In testimony whereof I have hereunto set my hand in the presence of two subscribing witnesses.

ANDREW J. CALDWELL.

Witnesses:
B. W. PIERSON,
E. H. FOSTER.